Patented Apr. 1, 1947

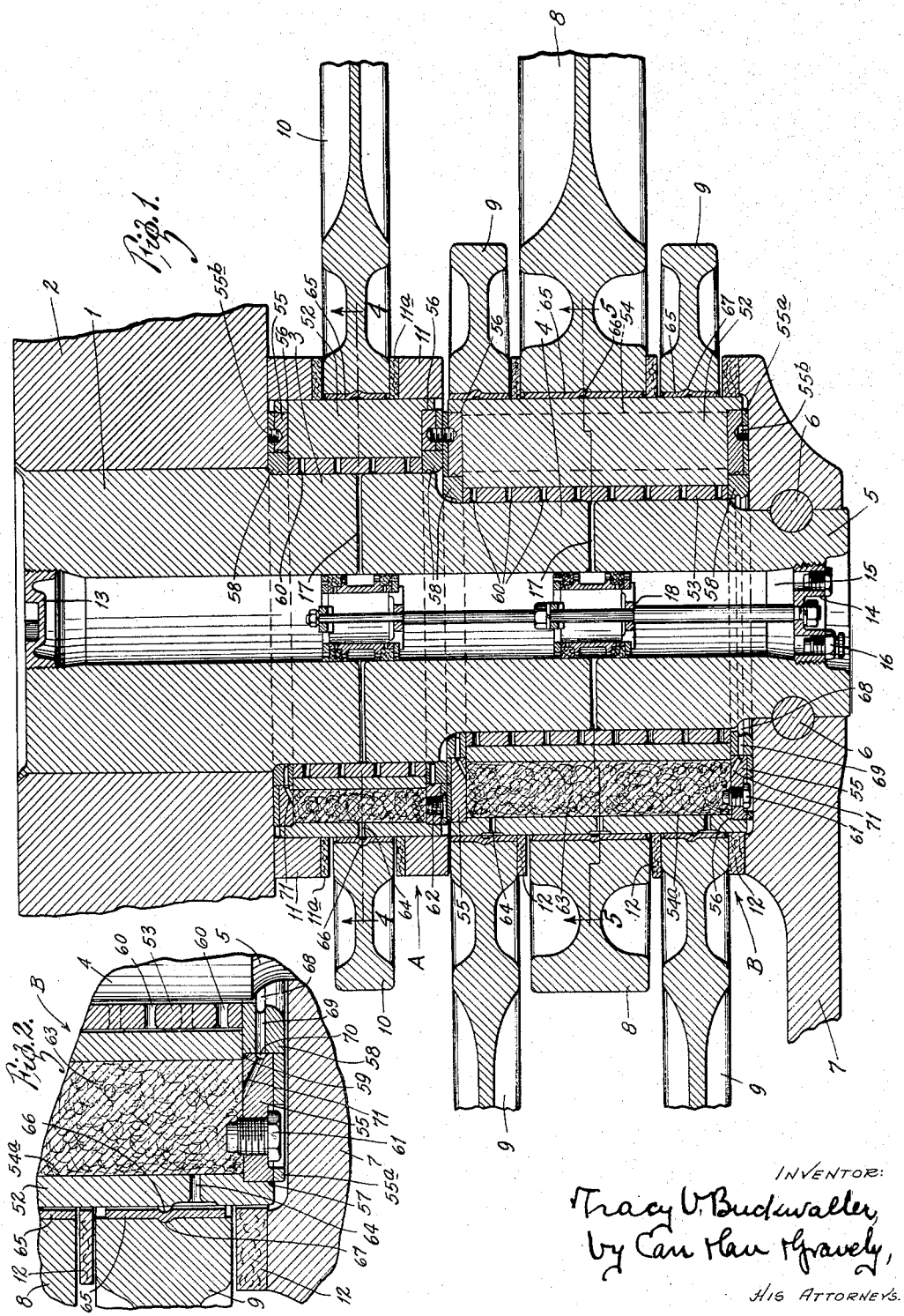

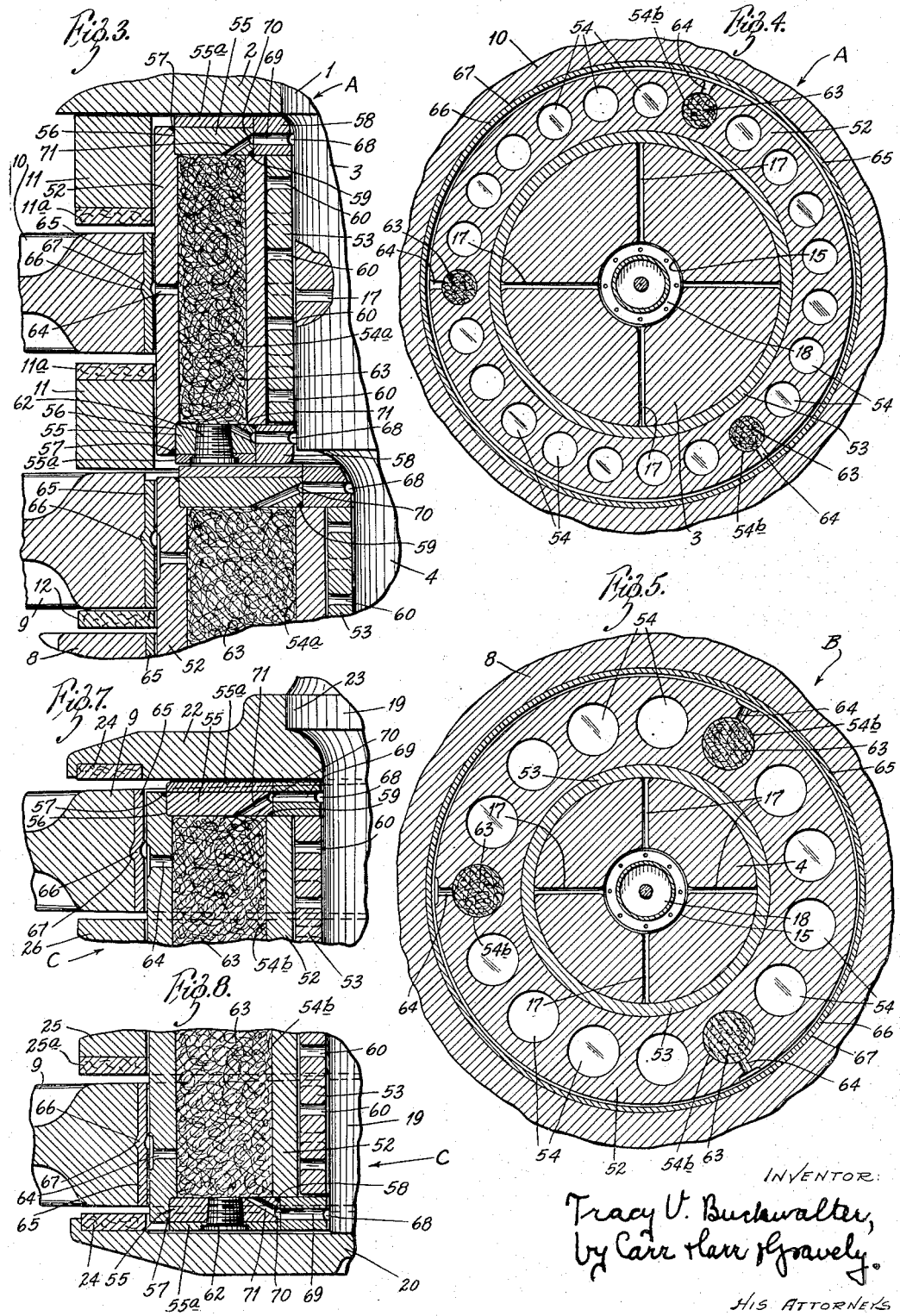

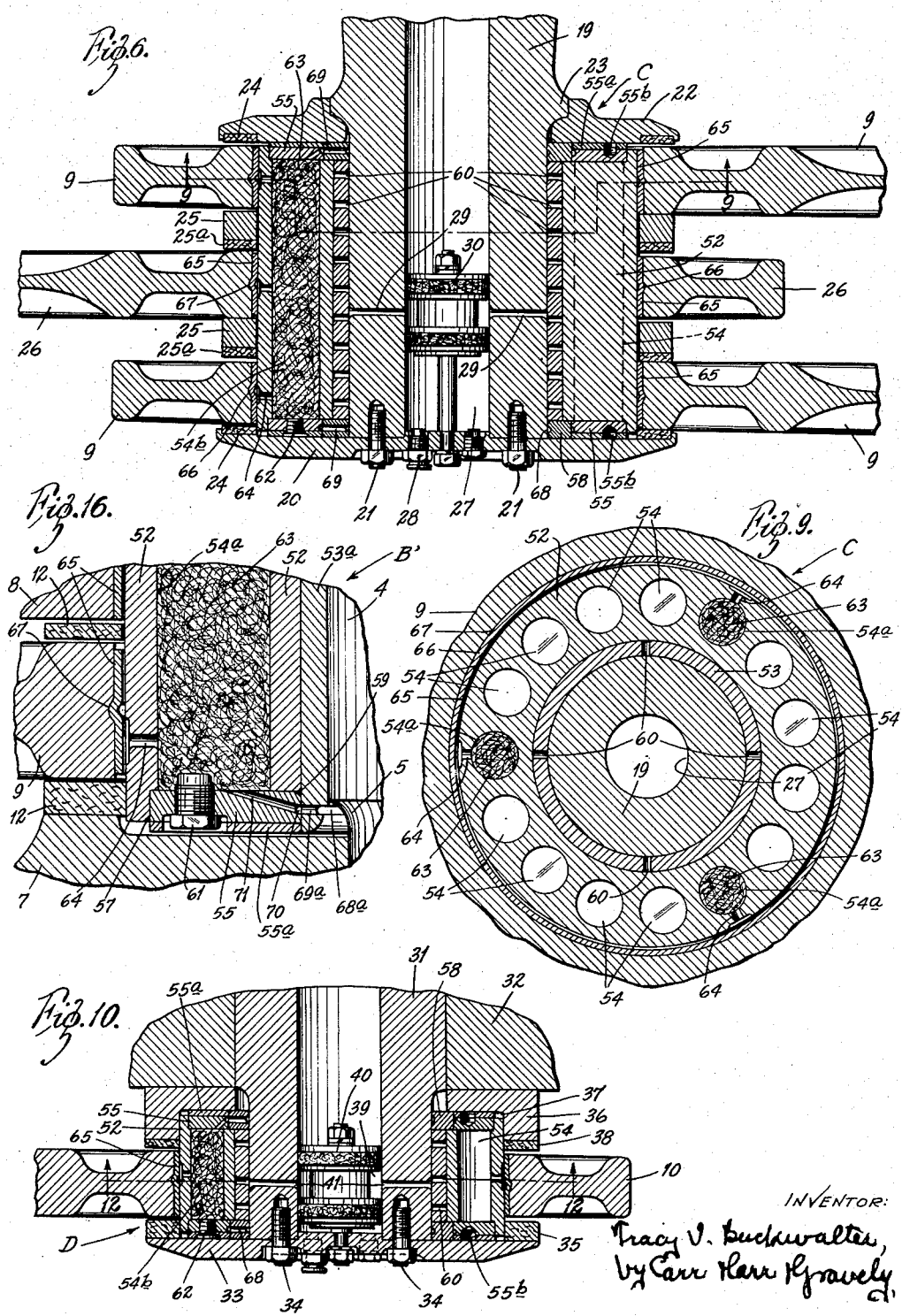

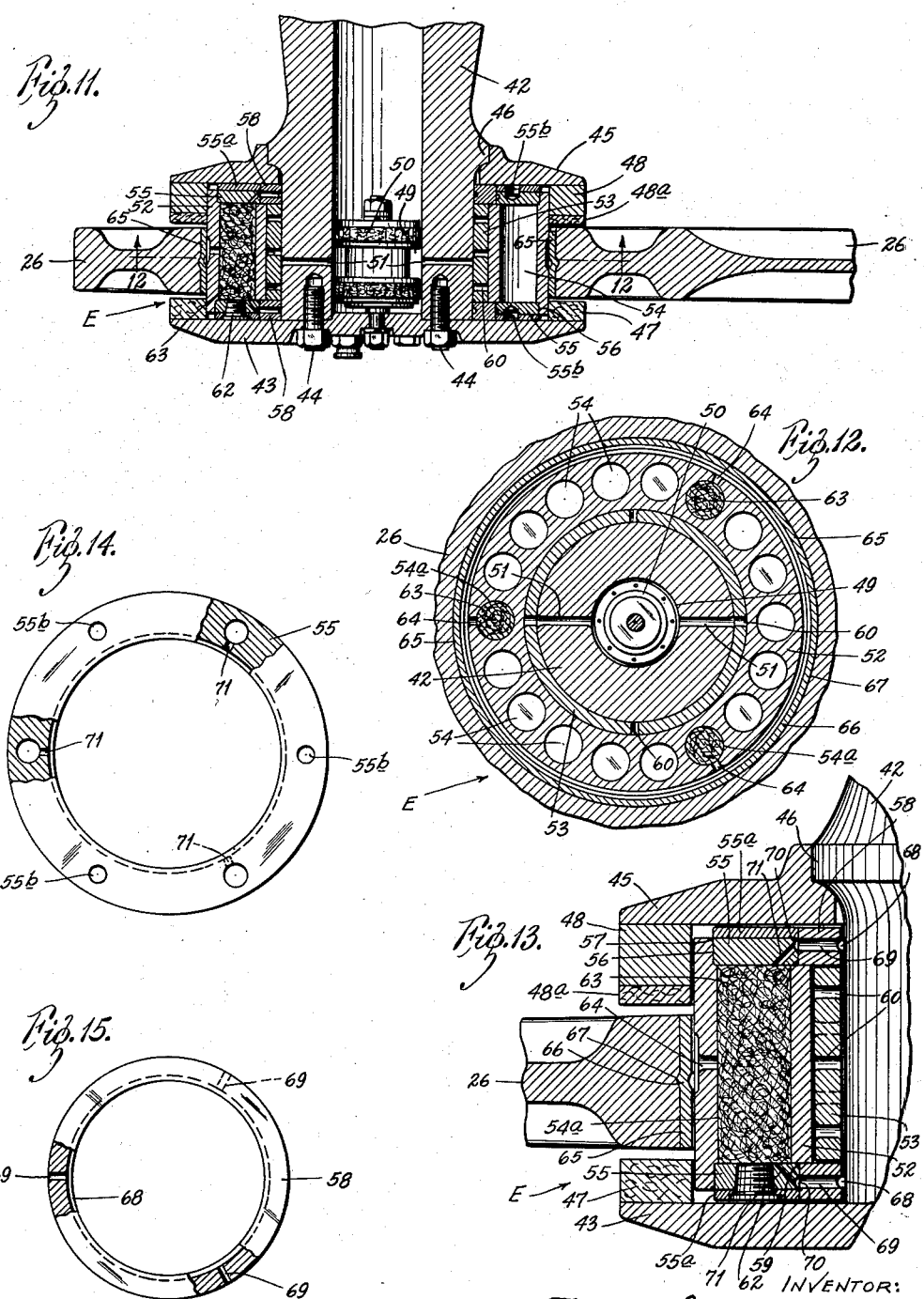

2,418,245

UNITED STATES PATENT OFFICE 2,418,245

CRANK PIN BEARING

Tracy V. Buckwalter, Massillon, Ohio, assignor to The Timken Roller Bearing Company, Canton, Ohio, a corporation of Ohio Application November 26, 1943, Serial No. 511,796

14 Claims. (Cl. 308—121)

1

This invention relates to crank pin bearings, particularly plain floating locomotive crank pin bearing constructions of the kind shown in my Patent No. 2,239,875. It has for its objects to provide more efficient lubrication for such bearings and reduce the weight thereof, to provide for unit handling of the bearing parts, to minimize the loss of lubricant from the bearing, to simplify the mounting of the liners in the eyes of the rods and to increase the efficiency of the rod spacers. The invention consists in the crank pin bearing constructions and in the parts and combination and arrangements of parts hereinafter described and claimed.

In the accompanying drawings, which form part of this specification and wherein like symbols refer to like parts wherever they occur, Fig. 1 is a central horizontal sectional view of a main crank pin bearing construction embodying my invention, Fig. 2 is a similar enlarged fragmentary sectional view of the outer end portion of the outermost main crank pin bearing, Fig. 3 is a similar sectional view of the innermost main crank pin bearing and the inner end portion of the outermost main crank pin bearing, Figs. 4 and 5 are vertical cross-sectional views on the lines 4—4 and 5—5, respectively, in Fig. 1, Fig. 6 is a central horizontal sectional view of an intermediate crank pin bearing construction embodying my invention, Fig. 7 is a similar enlarged fragmentary sectional view of the inner end portion of the intermediate crank pin bearing construction, Fig. 8 is a similar view of the outer end portion of the intermediate crank pin bearing construction, Fig. 9 is a vertical cross-sectional view on the line 9—9 in Fig. 6, Fig. 10 is a central horizontal sectional view of a front crank pin bearing construction embodying my invention, Fig. 11 is a central horizontal sectional view of a rear crank pin bearing construction embodying my invention, Fig. 12 is a vertical cross-sectional view on the lines 12—12 in Figs. 10 and 11, Fig. 13 is an enlarged fragmentary sectional view through one side of the rear crank pin bearing construction shown in Fig. 11, Fig. 14 is an outer end view of one of the annular end closure plates for the outer bushing of the rear crank pin bearing construction, Fig. 15 is an end view of the lubricating and

2 retainer ring which is secured within the opening of said annular end closure plate; and Fig. 16 is an enlarged fragmentary sectional view similar to Fig. 2 showing a modified form of main crank pin bearing construction.

In the main crank pin construction shown in Fig. 1, a crank pin 1 is fixed to a locomotive main drive wheel 2. The innermost portion 3 of the crank pin 1, that is, the portion adjacent to the wheel, is of larger outside diameter than the body portion 4 outwardly thereof and the outermost end portion 5 is further reduced in diameter.

Rotatably mounted on the enlarged innermost portion 3 of the crank pin 1 in endwise abutting relation to the outer face of the main drive wheel 2 is a plain, floating bearing unit A; and rotatably mounted on the reduced body portion 4 of said crank pin in endwise abutting relation to the bearing unit A is a second plain, floating bearing unit B whose outside diameter is the same as the outside diameter of the innermost bearing unit A. Fixed to the outermost end portion 5 of the crank pin 1, as by dowel pins 6, is a valve gear return crank 7 which serves to retain the bearing units A and B on said crank pin.

Journaled on the outermost bearing unit B is a main drive rod 8 which extends forwardly to the locomotive crosshead (not shown) by which it is driven. Similarly mounted on the outermost bearing unit B on opposite sides of the main rod 8 are twin intermediate side rods 9 which extend rearwardly to an intermediate crank pin bearing construction hereinafter described. Similarly mounted on the innermost bearing unit A is a front side rod 10 which extends forwardly to a front crank pin bearing construction hereinafter described. The main rod 8, intermediate rods 9 and front side rods 10 are spaced apart between the main drive wheel 2 and the combination valve gear return crank 7 and bearing and rod abutment or retainer by relatively thick combination spacer and wear rings 11 mounted loosely on the innermost bearing unit A between the wheel and front side rod and between the latter and the innermost intermediate side rod and by relatively thin spacing and wear rings mounted on the outermost bearing unit B between said innermost intermediate side rod and said main rod, between the latter and the outermost intermediate side rod and between the latter and said valve gear return crank. The thin abutment rings 12 are preferably made of fiber or other light-weight wear-resisting material, while each of the thick abutment rings 11 comprises a thick metal body with a thin replacement end section 11a of fiber or other light wear resisting material that is disposed in abutting relation to the front side rod 10.

The main crank pin 1 has an axial bore therethrough which is closed at its inner and outer ends by threaded plugs 13 and 14, respectively, to provide a chamber or reservoir 15 that is supplied with lubricant through a suitable oil feed fitting 16 threaded into the outermost screw plug 14. The crank pin 1 has radial passageways 17 therein leading from the reservoir 15 to the bearing supporting surfaces of said crank pin. A slow feed of the lubricant from the reservoir 14 in the crank pin 1 to the bearing units A and B thereon is provided by means of a suitable lubricant retarding device 18, preferably of the type disclosed in my Patent No. 2,239,875.

The intermediate crank pin bearing construction shown in Fig. 6 comprises a hollow crank pin 19 fixed to the intermediate locomotive driving wheel (not shown), a plain floating bearing unit C mounted on said pin between a circular retainer plate 20 removably secured by screws 21 to the outer end of said crank pin, and an annular retainer plate 22 mounted on said crank pin in abutting relation to an annular peripheral shoulder 23 thereon. The bearing and rod retainer or abutment plates 20 and 22 have fiber wear rings 24 press-fitted in seats provided therefor in the intermediate side rod opposing faces thereof; and rod spacers 25 are loosely mounted on the bearing unit C between a rear side rod 26 and the intermediate side rods 9 on opposite sides thereof and having replaceable fiber end sections 25a. The intermediate side rods 9 are mounted on the bearing unit C near the opposite ends thereof; and the rear side rod is similarly mounted on said bearing unit between the two intermediate side rods and extends rearwardly to a rear crank pin bearing construction hereinafter described.

The reservoir 27 in the hollow intermediate crank pin 19 is closed by the retainer plate 21 which is provided with a suitable oil feed fitting 28. The intermediate crank pin 19 has a series of radial passageways 29 leading from the reservoir 27 therein to the bearing supporting surface of said pin, said reservoir being provided with a suitable lubricant retarding device 30 similar to the lubricant retarding device 18 of the main crank pin construction.

The front crank pin bearing construction shown in Fig. 10 comprises a crank pin 31 fixed to the front driving wheel 32 of the locomotive and a plain, floating bearing unit D mounted on said crank pin and held thereon by means of a circular retainer plate 33 secured by cap screws 34 to the outer of said crank pin. The front side rod 10 is mounted on the bearing unit D between a fiber wear ring 35 interposed between said rod and the retaining plate 33 and an abutment ring 36 that has an annular recess 37 therein in which is received the inner end of said bearing unit. The abutment ring 36 is provided radially outwardly of the bearing unit D with a fiber wear ring 38 disposed in abutting relation to the inner face of the front side rod 10. The front crank pin 31 has a lubricant reservoir 39 therein, a suitable oil retarding device 40 in said reservoir, and a series of radial passageways 41 that lead from said reservoir to the bearing supporting surface of said crank pin.

The rear crank pin bearing construction shown in Fig. 11 comprises a crank pin 42 that is fixed to the rear driving wheel (not shown) of the locomotive, a plain, floating bearing unit E mounted on said crank pin between a circular retainer plate 43 attached by screws 44 to the outer end of said crank pin, and a retainer ring 45 sleeved on said crank pin in abutting relation to a peripheral abutment shoulder 46 on said crank pin. The rear side rod 26 is mounted on the bearing unit E between the retaining plate 43 and retaining ring 45, a fiber wear ring 47 is interposed between said retaining plate and the rear side rod, and a metal spacing ring 48 is sleeved on said bearing between said side rod and retaining ring and has a replaceable fiber end section 48a disposed in abutting relation to the inner face of said rear side rod. The rear crank pin 42 has a lubricant reservoir 49 therein, a suitable oil retarding device 50 in said reservoir, and a plurality of radial passageways 51 that lead from said reservoir to the bearing supporting surface of said crank pin.

Except for differences in size, the main crank pin bearing units A and B, the intermediate crank pin bearing unit C, the front crank pin bearing unit D, and the rear crank bearing unit E are all of the same construction. Thus each of the bearing units A, B, C, D and E comprises two relatively rotatable bushings, a relatively thick outer bushing 52, preferably of iron or steel or other hard, strong metal and a relatively thin bushing 53, preferably of bronze or other bearing metal mounted in said outer bushing. The outer bushing 52 has a series of circumferentially spaced bores or openings 54 extending therethrough from end to end thereof; and these openings are closed by means of annular plates 55 that seat in circular recesses 56 provided therefor in the ends of said bushing. The annular end closure plates 55 are press-fitted in the recesses 56 and are preferably further secured therein by welds 57. The inner bushing 53 is retained in the outermost bushing 52 by means of bronze rings 58 that are press-fitted in the openings in the annular end closure plates 55 and are also welded, as at 59, thereto in overlapping relation to the ends of said inner bushing and have inside diameters substantially the same as the inside diameter of said inner bushing.

The inner bushing 53 has a plurality of radial passageways 60 therethrough adapted to convey lubricant from the inner crank pin engaging surface of said bushing to the outside outer bushing supporting surface thereof. Some of the holes 54 in the outer bushing 52 are adapted to constitute lubricant reservoirs 54a therein; and these reservoirs are supplied with lubricant through pressure fittings 61 threaded into outermost end plates of the bearing units B, C, D and E and through holes in the outermost end plates of the bearing unit A, said holes being closed by threaded plugs 62. As shown in the drawings, the lubricant reservoirs 54a in the outer bushing 52 are preferably filled with wool waste or other suitable material 63 for retarding the flow of oil therethrough. The outer bushing 52 has series of radial passageways 64 leading from the lubricant reservoirs 54a therein to the outer load supporting surface thereof. These passageways are located opposite the rod or rods supported on the bushing; and the bearing receiving eye of each of the main, intermediate, front and side rods has a thin tubular liner 65 pressed therein whose intermediate portion 66 is rolled into an annular groove 67 provided therefor in said eye.

As shown in the drawings, each of the annular end closure plates 55 of each bearing unit has an annular plate 55a of bronze or other bearing metal welded to the outer end face thereof adapted to take the wear due to relative endwise movement of the bearing unit and the parts disposed in abutting relation to the ends thereof; and each of said annular closure plates has a series of threaded holes 55b in the outer end face thereof adapted to receive the threaded ends of pull rods (not shown). The bronze ring 58, which is mounted in and forms part of the annular end closure plates 55, of each bearing unit, has an annular groove 68 in the inner periphery thereof and a series of radial passageways 69 that lead from said annular groove and open through the outer peripheral surface of said ring into a second annular groove 70 in the ring receiving opening of said annular end closure plate, which second annular groove opens into the oil reservoirs 54a in the outer bushing 52 of the bearing unit through radial passageways 71 in said annular end closure plate. By this arrangement, communication is established between the substantially closed spaces at the ends of the joint between the crank pin and the inner bushing 53 of each bearing unit and the corresponding ends of the reservoirs 54a in the outer bushing 52.

By the arrangement described, oil is forced by centrifugal action from the reservoir in each crank pin through the radial passageways therein and flows between said pin and the inner bushing 52 of the bearing unit mounted thereon and towards the opposite ends of said bushing; and any oil that escapes from said ends of said bushing is thrown by centrifugal force into the annular grooves 68 in the lubricating rings 58 and is conveyed to the several reservoirs 54a in the outer bushing 52 through the passageways 69 and 71 leading to said reservoirs. The oil fed to the cooperating surfaces of the crank pin and inner bushing 53 of the bearing unit flows through the radial holes or passageways 60 in said bushing and thence between the cooperating outer and inner peripheral surfaces of said inner bushing and the outer bushing 52, respectively, the escape of such oil from the ends of the bearing unit being prevented by means of the lubricating rings 58 which cover the ends of the joint between the two bushings. The oil retaining rings 58 also serve to retain the inner bushing 53 in the outer bushing 52, whereby the two bushings are adapted for mounting and dismounting as a self-contained unit.

The cooperating surfaces of the outer bushing 52 and the eye liners 65 of the rods journaled thereon are adequately lubricated by the oil contained in the several reservoirs 54a formed in said outer bushing, the oil being fed under pressure by centrifugal force through the radial passageways 64 leading from said reservoirs to the cooperating surfaces of said outer bushing and rod liners. The thin fiber wear or rod spacer rings of each crank pin bearing construction may be easily removed and replaced when worn or damaged; and the thin fiber wear sections of the thicker rod abutment or spacer ring may also be replaced without discarding the entire ring.

The reservoirs in the crank pins and in all of the bearing units, except the innermost bearing unit A of the main crank pin construction, may be filled without dismounting any of the parts, the reservoirs of the innermost bearing unit A being filled after the removal of the outermost bearing unit B at each monthly inspection of the crank pin bearing construction. The inner and outer bushings of each bearing unit float in oil and are rotatable relative to each other and to the crank pin and rods. Thus, the two bushings are free to float and are constantly presenting new surfaces to distribute the oil uniformly and to take the wear under the loads. The inner and outer bushings, the annular end closures 55 therefor and the bronze retaining rings 58 carried by said end closures are permanently secured together to form a bearing assembly adapted for application to and removal from the crank pin construction as a preassembled unit, while the holes 54 in the outer bushing of each bearing unit serve to reduce the weight thereof and to provide the number of reservoirs 54a required for supplying lubricant to liners 65 in the eyes of the rod or rods supported on said bearing unit. The bearing units may be quickly and easily removed without disturbing the rods merely by removing the retaining member at the outer end of the crank pin; and the threaded holes 55a in the outer ends of the bearing units afford means for attaching a pulling device thereto. The bearing units A and B of the main crank pin construction are of the same outside diameter, thereby permitting removal of these units through the eyes of the rods without dismounting the latter.

In the modified main crank pin bearing construction shown in Fig. 16, the bronze inner bushing 53a of the floating bearing unit B' for the main rod 8 and the intermediate side rods 9 is press-fitted in the steel outer bushing 52, instead of being rotatable therewith, and the annular oil collecting groove 68a and the radial passageways 69a leading therefrom are located in said inner bushing, instead of being located in the bronze oil collecting ring 58. This modified construction is particularly adapted for use in heavy locomotives wherein the heavy loads transmitted from the main rod 8 to the main crank pin 1 through the floating inner bushing of the bearing unit B is liable to cause said bushing to fail or elongate and displace the oil collecting rings 58.

Obviously, the hereinbefore described arrangement admits of considerable modification without departing from the invention. Therefore, I do not wish to be limited to the precise construction shown.

What I claim is:

1. A locomotive crank pin bearing construction comprising a crank pin, an inner floating bushing mounted on said crank pin, an outer floating bushing mounted on said inner bushing, a rod journaled on said outer bushing, said outer bushing having a series of separate circumferentially spaced lubricant containing reservoirs therein extending longitudinally thereof and passageways leading from the respective reservoirs to the outer peripheral rod supporting surface of said outer bushing, means in said reservoirs for retarding the flow of lubricant therein to the passageways leading therefrom, an means for supplying lubricant to each of said reservoirs through one end of said outer bushing.

2. A locomotive crank pin bearing construction comprising a crank pin, an inner bushing journaled on said crank pin, a metal outer bushing journaled on said inner bushing, a rod journaled on said outer bushing, said outer bushing having a series of circumferentially spaced lightening bores extending therethrough from end to end thereof, a single annular plate rigidly secured to each end of said outer bushing for unit handling therewith and for closing the corresponding ends of all of said lightening bores, whereby some of said bores are adapted to constitute separate reservoirs for lubricant, said outer bushing having drilled passageways leading from said reservoirs to the outer peripheral rod supporting surface of said outer bushing and means carried by the annular member at one end of said bushing for supplying lubricant to said reservoirs.

3. A locomotive crank pin bearing construction comprising a crank pin, a floating inner bushing mounted on said crank pin, a floating outer bushing mounted on said inner bushing, a floating rod mounted on said outer bushing, said outer bushing having a series of circumferentially spaced openings extending therethrough from end to end thereof, annular end plates fixed to said outer bushing for closing the ends of the openings therethrough, whereby some of said openings are adapted to constitute reservoirs for lubricant, said outer bushing having passageways leading from such lubricant reservoirs to the outer peripheral rod supporting surface of said outer bushing, said end closure plates overlapping the ends of said inner bushing to thereby prevent endwise separation of said inner and outer bushings.

4. A locomotive crank pin bearing construction comprising a crank pin, an inner floating bushing mounted on said crank pin, an outer floating bushing mounted on said inner bushing, a rod mounted on said outer bushing, said crank pin having a lubricant containing reservoir therein and passageways leading from said reservoir to said inner bushing, said inner bushing having a plurality of radial lubricant passageways therethrough, said outer bushing having a lubricant containing reservoir therein and passageways leading from said reservoir to the outer peripheral rod supporting surface of said outer bushing, means in the reservoir in said outer bushing for retarding the flow of lubricant therein to the passageways leading therefrom, and means for supplying oil to the reservoir in said outer bushing through the outer end thereof.

5. A locomotive crank pin bearing construction comprising a crank pin, an inner bushing mounted on said crank pin, an outer bushing mounted on said inner bushing and having a series of circumferentially spaced openings therein extending from end to end thereof, annular end plates secured to said outer bushing and closing the openings therein and overlapping the ends of said inner bushing, some of said openings in said outer bushing constituting reservoirs for lubricant, said outer bushing having passageways leading from such reservoirs to the outer peripheral rod supporting surface of said outer bushing, said crank pin having a reservoir for lubricant therein and passageways leading from said reservoir to said inner bushing, said inner bushing having a series of radial lubricant passageways therethrough, and means for supplying lubricant to the reservoir in said outer bushing through the outermost annular end plate.

6. A locomotive crank pin bearing construction comprising a crank pin, a floating inner bushing mounted on said crank pin, an outer bushing mounted on said inner bushing member and a rod mounted on said outer bushing, annular end plates secured to said outer bushing in overlapping relation to the ends of said inner bushing, said outer bushing having a series of holes that extend therethrough from end to end thereof and are closed by said annular end plates, some of said openings constituting lubricant reservoirs, said outer bushing having passageways leading from such reservoirs to the outer peripheral rod supporting surfaces of said outer bushing.

7. A locomotive crank pin bearing construction comprising a crank pin, a floating inner bushing mounted on said crank pin, an outer bushing mounted on said inner bushing member, a rod mounted on said outer bushing, and annular end plates secured to said outer bushing in overlapping relation to the ends of said inner bushing, said outer bushing having a series of holes that extend therethrough from end to end thereof and are closed by said annular end plates, some of said openings constituting lubricant reservoirs, said outer bushing having passageways leading from such reservoirs to the outer peripheral rod supporting surfaces of said outer bushing, said inner bushing having radial lubricant passageways therethrough and said crank pin having a lubricant reservoir and passageways leading from said crank pin reservoir to said inner bushing, said annular end plates having passageways therein leading from the openings therein to the lubricant reservoirs in said outer bushing.

8. A locomotive crank pin bearing construction comprising a crank pin, a floating inner bushing mounted on said crank pin, an outer bushing member on said inner bushing member, a rod mounted on said outer bushing, annular end plates secured to said outer bushing, said outer bushing having a series of holes that extend therethrough from end to end thereof and are closed by said annular end plates, some of said openings constituting lubricant reservoirs, said outer bushing having passageways leading from such reservoirs to the outer peripheral rod supporting surfaces of said outer bushing, said inner bushing having radial lubricant passageways therethrough and said crank pin having a lubricant reservoir and passageways leading from said reservoir to said inner bushing, and annular members fixed in the openings in said annular end plates in overlapping relation to the ends of said inner bushing, said annular end plates and members having communicating passageways therein leading from the openings in said annular members to the reservoirs in said outer bushing.

9. A locomotive crank pin bearing construction comprising a crank pin, a floating inner bushing mounted on said crank pin, a floating outer bushing mounted on said inner bushing, a rod journaled on said outer bushing, said outer bushing having a reservoir for lubricant therein and passageways leading from said reservoir to the outer peripheral rod supporting surface of said outer bushing, and an annular rod abutment member mounted around said outer bushing and including a relatively thick metal body and a relatively thin replaceable end section of fiber disposed in abutting relation to one side of said rod.

10. A plain bearing unit comprising an inner bushing, an outer bushing mounted on said inner bushing, said outer bushing having a series of circumferentially spaced openings extending therethrough from end to end thereof, and annular plates secured to the ends of said outer bushing for closing the openings therethrough, whereby said openings are adapted to constitute separate reservoirs for lubricant, said outer bushing having passageways leading from said reservoirs to the outer peripheral surface of said outer bushing, said annular plates overlapping the ends of said inner bushing to thereby prevent endwise separation of said inner and outer bushings.

11. A plain bearing unit comprising an inner bushing, an outer bushing mounted on said inner bushing, said outer bushing having a series of circumferentially spaced openings extending therethrough from end to end thereof, and annular plates secured to the ends of said outer bushing for closing the openings therethrough, whereby said openings are adapted to constitute reservoirs for lubricant, said outer bushing having passageways leading from said reservoirs to the outer peripheral surface of said outer bushing, said annular plates overlapping the ends of said inner bushing and having passageways leading from the openings in said annular plates to the reservoirs in said outer bushing.

12. A plain bearing unit comprising an inner bushing having a plurality of radial lubricant passageways therethrough, an outer bushing mounted on said inner bushing and having a series of circumferentially spaced openings therein extending from end to end thereof, annular end plates secured to said outer bushing and closing the openings therein, some of said openings in said outer bushing constituting reservoirs for lubricant, said outer bushing having passageways leading from such reservoirs to the outer peripheral surface of said outer bushing, and annular members secured in the openings in said annular plates and overlapping the ends of said inner bushing, said annular plates and members having communicating passageways therein leading from the openings in said annular members to said reservoirs.

13. A locomotive crank pin bearing construction comprising a crank pin, a floating bearing journaled on said crank pin and including an outer bushing and an inner bushing rigid with said outer bushing, a rod journaled on said outer bushing, means for supplying lubricant to the cooperating surfaces of said crank pin and inner bushing, said outer bushing having a series of circumferentially spaced openings extending therethrough from end to end thereof, and annular end plates secured to said outer bushing and closing the openings therethrough, whereby said openings are adapted to constitute reservoirs for lubricant, said outer bushing having passageways leading from said reservoirs to the outer peripheral surface of said outer bushing, said annular end plates fitting around the ends of said inner bushing and having passageways leading from the openings in said annular end plates to the reservoirs in said outer bushing, said ends of said inner bushing having internal annular grooves therein and radial passageways leading from the inner peripheral surface thereof and communicating with the radial passageways in said annular end plates.

14. A plain bearing unit comprising an outer bushing having a series of circumferentially spaced openings extending therethrough from end to end thereof, annular end plates secured to said outer bushing and closing the openings therein, some of said openings in said outer bushings constituting reservoirs for lubricant, said outer bushing having passageways leading from said reservoirs to the outer peripheral surface of said outer bushing, and an inner bushing rigidly mounted in said outer bushing with its ends fitting within the openings in said annular end plates, said inner bushings and annular end plates having communicating passageways therein leading from the inner periphery of said inner bushing to said reservoirs.

TRACY V. BUCKWALTER.

REFERENCES CITED

The following references are of record in the file of this patent:

UNITED STATES PATENTS

| Number | Name | Date |
| --- | --- | --- |
| 460,232 | Hoen | Sept. 29, 1891 |
| 2,239,875 | Buckwalter | Apr. 29, 1941 |
| 444,812 | Carey | Jan. 20, 1891 |
| 668,057 | Shaughnessy et al. | Feb. 12, 1901 |
| 1,995,548 | Mermigis | Mar. 26, 1935 |
| 2,225,876 | Mead | Dec. 24, 1940 |

FOREIGN PATENTS

| Number | Country | Date |
| --- | --- | --- |
| 437,052 | Br. | 1935 |
| 472,581 | Ger. | Aug. 26, 1931 |